United States Patent [19]

Wilson et al.

[11] Patent Number: 4,792,881
[45] Date of Patent: * Dec. 20, 1988

[54] WORK SURFACE WITH POWER AND COMMUNICATION MODULE

[75] Inventors: Harold R. Wilson, Holland; Allen B. Belka, Wayland, both of Mich.

[73] Assignee: Haworth, Inc., Holland, Mich.

[*] Notice: The portion of the term of this patent subsequent to Mar. 31, 2004 has been disclaimed.

[21] Appl. No.: 32,107

[22] Filed: Mar. 27, 1987

Related U.S. Application Data

[63] Continuation of Ser. No. 699,117, Feb. 7, 1985, Pat. No. 4,654,756.

[51] Int. Cl.⁴ .............................. H02B 1/20
[52] U.S. Cl. ........................ 361/428; 312/223
[58] Field of Search ............. 361/48; 174/58, 48, 174/49; 312/208, 223; 200/61.62; 108/108

[56] References Cited

U.S. PATENT DOCUMENTS

| | | | |
|---|---|---|---|
| 2,306,209 | 12/1942 | Elofson et al. | 312/208 |
| 3,373,703 | 3/1968 | Barecki | 108/50 |
| 3,635,174 | 1/1972 | Ball | 108/50 |
| 3,783,175 | 1/1974 | Timmons | 174/48 |
| 3,883,202 | 5/1975 | Konig | 312/223 |
| 4,094,256 | 6/1978 | Holper | 108/50 |
| 4,296,981 | 10/1981 | Hildebrandt et al. | 312/194 |
| 4,323,291 | 4/1982 | Ball | 312/194 |
| 4,372,629 | 2/1983 | Propst et al. | 312/223 |

FOREIGN PATENT DOCUMENTS

0006707A1 1/1980 European Pat. Off. .
0010277A1 4/1980 European Pat. Off. .

*Primary Examiner*—A. D. Pellinen
*Assistant Examiner*—Morris Ginsburg
*Attorney, Agent, or Firm*—Flynn, Thiel Boutell & Tanis

[57] ABSTRACT

A work surface structure having a power/communication module integral therewith. This module is hidden beneath a door which is flush with and forms a part of the top of the work surface structure. This module permits numerous power and communication (i.e. data) cables to be fed into the module for connection to appropriate connectors, and excess lengths of cable can be stored within a compartment of the module. Additional cable storage compartments are hidden below the top of the work surface for storing therein excess lengths of power/communication cables which extend from external locations to the module.

6 Claims, 4 Drawing Sheets

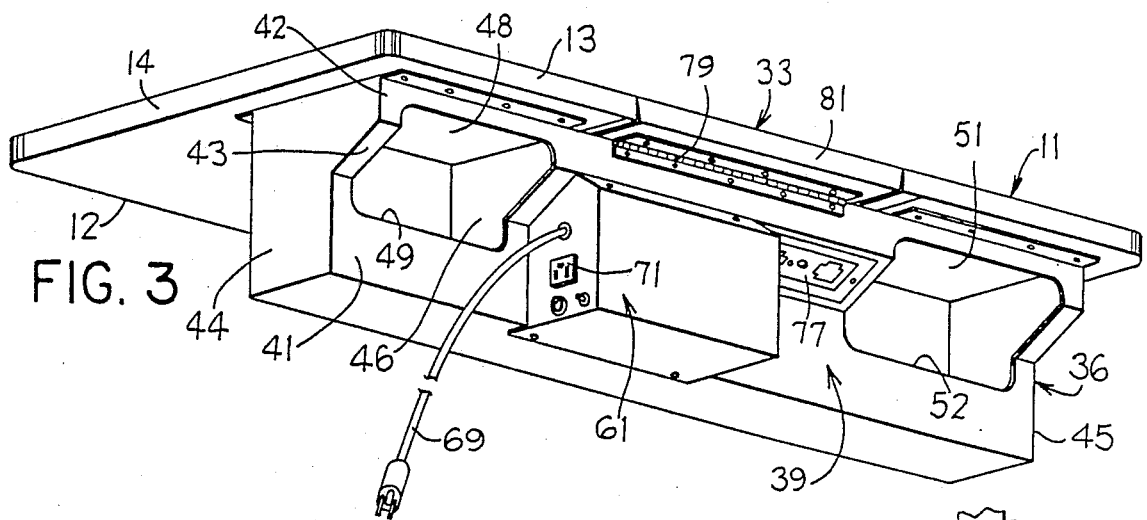
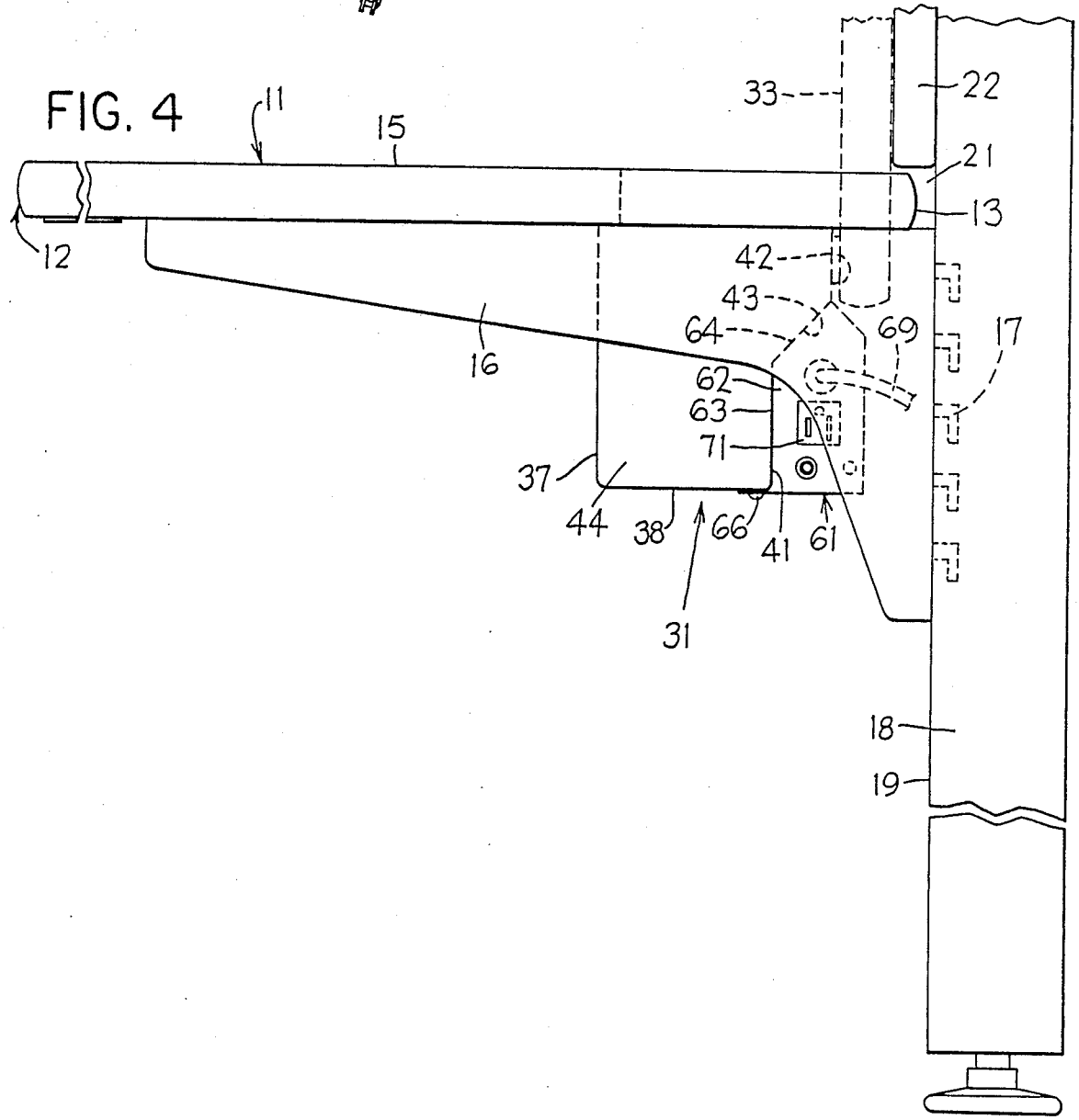

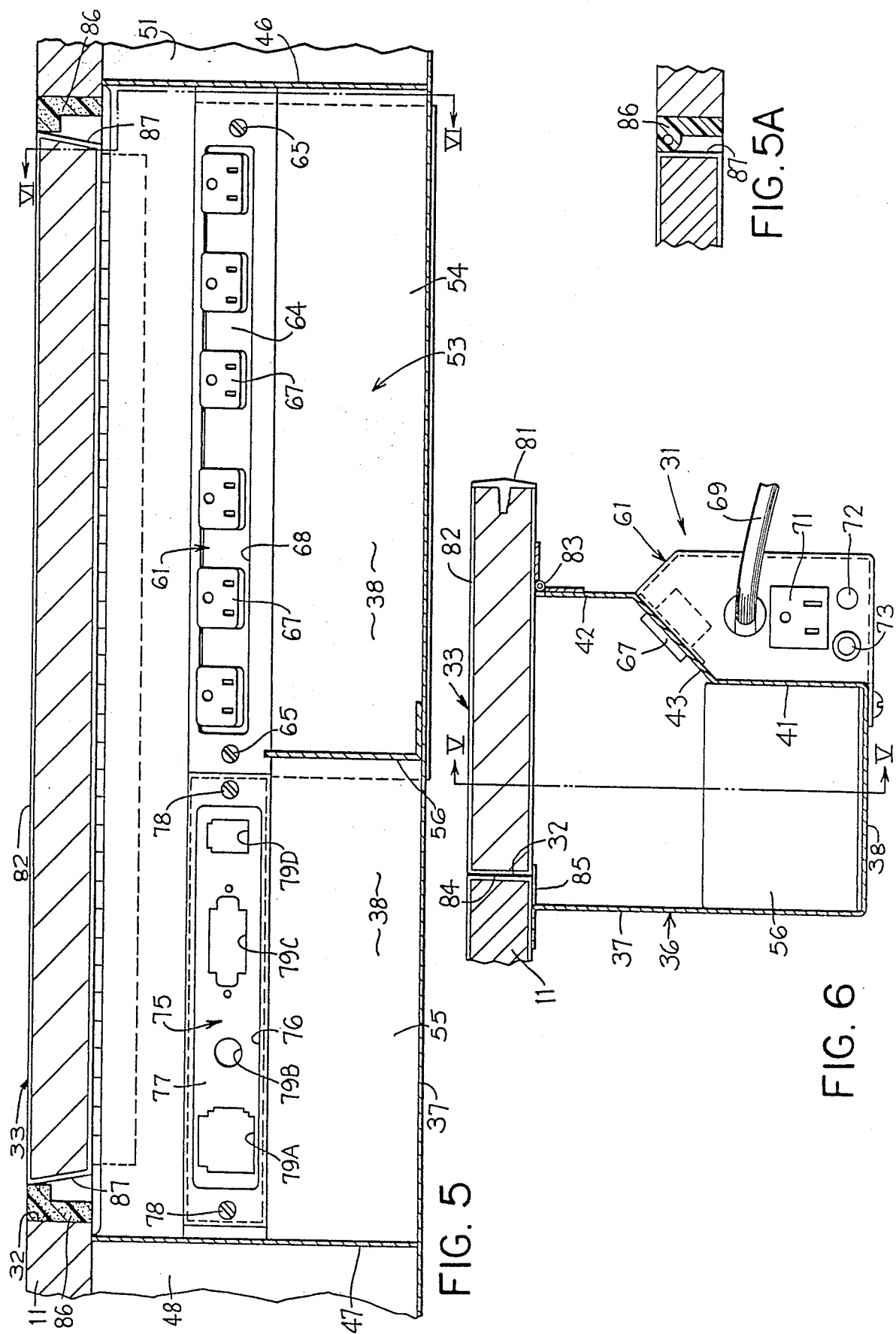

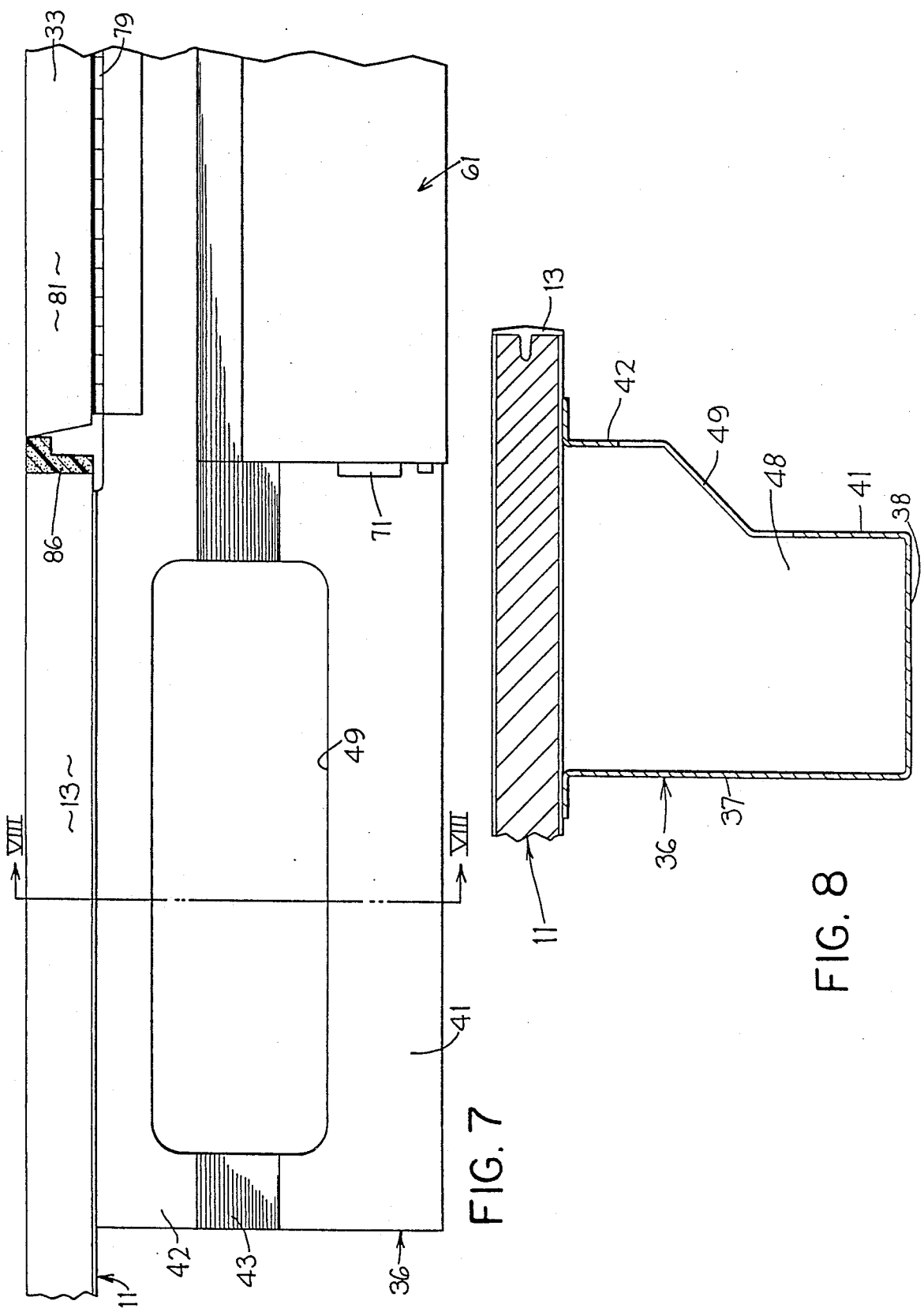

WORK SURFACE WITH POWER AND COMMUNICATION MODULE

This is a continuation of application Ser. No. 699,117, filed Feb. 7, 1985, now U.S. Pat. No. 4,654,756, issued on Mar. 31, 1987.

FIELD OF THE INVENTION

This invention relates to a work surface structure, such as for a table or for mounting on a wall panel, which work surface structure has a power and communication module integrally associated therewith.

BACKGROUND OF THE INVENTION

The modern office environment utilizes large numbers of electrified apparatus such as typewriters, computers and the like so that the electrical power demands are significant. These demands have been significantly affected by the dramatic increase in the use of small computers throughout offices, which computers generally employ not only numerous power cables, but also communication cables so as to permit individual workstations to be networked together or connected to a main frame computer. The typical office also has need for other power or communication connections, such as connections for telephones and the like. A typical office hence has numerous power and communication cables which extend to and connect to typical equipment mounted on a work surface such as a table or desk. In many modern offices, the open office concept is employed, wherein large open office areas are divided by systems of upright wall panels which mount thereon accessories such as work tables, the latter commonly being referred to as "work surfaces". Due to the amount of equipment positioned on the work surfaces and the substantial number of power and communication cables which extend therefrom, the handling of these cables both on the work surface and in the surrounding environment, such as on the floor, has created a serious problem both with respect to the unsightliness and the inconvenience caused by the cables, and the danger created by the fact that these cables when permitted to lie on the floor can cause tripping of individuals which can be harmful to both people and equipment.

In an attempt to resolve this problem, numerous solutions have been suggested. For example, power receptacles have been mounted in walls or wall panels substantially at table or desk height so as to avoid running cords along the floor, although such receptacles still result in undesirable lengths of power cable being positioned on the desk or work surface so as to significantly interfere with usage of the work surface. Power receptacles have also been provided directly on the upper surface of the work surface, but these obviously possess the same disadvantage. Attempts have also been made to provide a large recessed channel along one edge of the work surface, although such channel is normally accessible by means of a rather large removable cover which in effect does not comprise a usable part of the work surface, so that the resulting structure is both complex and inefficient in that it does not permit efficient utilization of all the available work surface, and does not wholly solve the problem of convenient access to the connectors or elimination of undesired cable lengths.

Accordingly, it is an object of this invention to provide an improved work surface structure, either for mounting on a wall panel or for a free standing table or desk, which significantly improves upon the known structures by eliminating or greatly minimizing many of the above-mentioned disadvantages. More specifically, the improved work surface structure of this invention provides a power/communication module integral with the work surface structure. This module is readily and conveniently accessible when desired, but is hidden beneath a door which is flush with and forms a part of the top of the work surface structure so as to hence not interfere with the usability of the overall working surface area. At the same time, this module permits numerous cables such as power and communication (i.e. data) cables to be readily fed into the module for connection to appropriate connectors, and excess lengths of cable can be stored within a compartment of the module to permit only minimal and required lengths of cable to be positioned on the upper working surface. The module also includes additional cable storage compartments which are hidden below the top of the work surface, which additional compartments permit storage therein of excess lengths of power/communication cables which extend from external locations to the module, whereby excess lengths of these cables hence are not running along the floor whereby unsightly and hazardous conditions are hence avoided.

In the work surface structure of this invention, the structure is formed primarily by a top structure which resembles a conventional table or desk top. This top structure defines an enlarged planar working surface. Adjacent the rear edge thereof, the top includes a door which is substantially flush with the working surface when closed, and which when swung upwardly into an open position provides access to a compartment in which is positioned a control module. The control module has a conveniently oriented panel mounting thereon connectors for power and communication cables. Plug-like connectors, such as power plugs or telephone jacks, can hence be appropriately plugged into this control panel. The compartment, in front of the control panel, has appropriate chambers in which excess cable can be stored. The door, when closed, hides the excess cable and the cable connectors, and the cable projects upwardly through deformable strips which extend along the opposite side edges of the door so as to minimize the length of cable which extends along the upper working sufface. The compartment for the communication module is formed by an elongated trough-like member which extends longitudinally of the underside of the work surface top adjacent the rearward edge thereof. This trough, preferably on opposite sides of the control panel, defines therein rearwardly-opening cable storage compartments which accommodate excess cable as associated with the power/communication cables which extend from external locations to the control panel so as to permit hidden storage of this excess cable.

Other objects and purposes of the invention will be apparent to persons familiar with structures of this general type upon reading the following specification and inspecting the accompanying drawings.

BRIEF DESCRIPTION OF THE DRAWINGS

FIG. 3 is a rear-oriented perspective view of the work surface structure.

FIG. 4 is a side elevational view of the work surface structure as mounted on a conventional wall panel.

FIG. 5 is an enlarged, fragmentary, sectional view taken substantially along the line V—V in FIG. 6.

FIG. 5A is a fragmentary sectional view of a modification.

FIG. 6 is a fragmentary, sectional view taken substantially along the line VI—VI in FIG. 5.

FIG. 7 is an enlarged, fragmentary, elevational view showing the backside of the work surface structure.

FIG. 8 is a sectional view taken substantially along the line VIII—VIII in FIG. 7.

Figure 1:
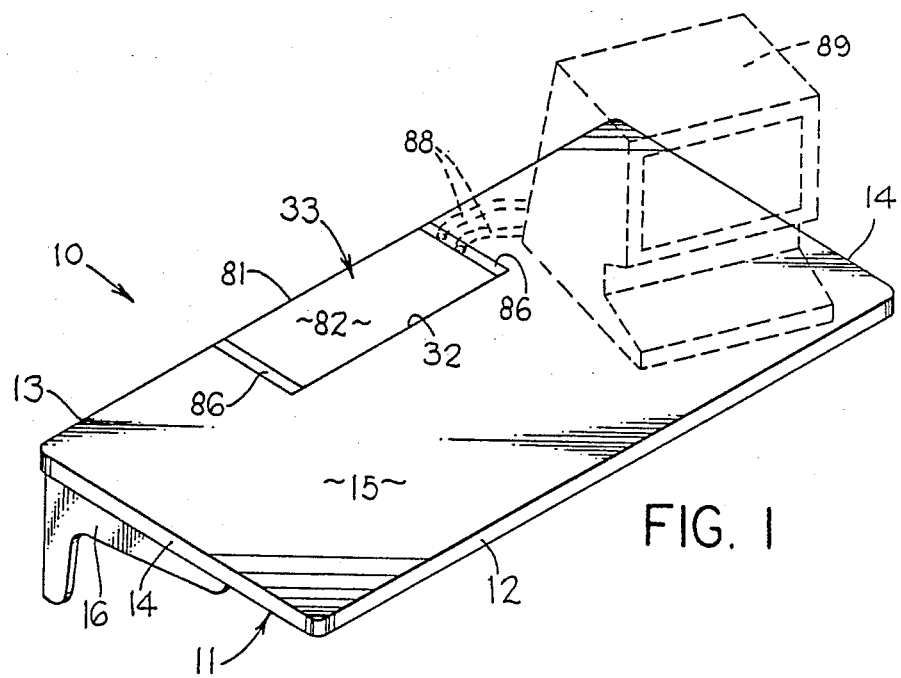
FIG. 1 is a front-oriented perspective view of the work surface structure illustrating the door to the control panel in a closed position.

Certain terminology will be used in the following description for convenience in reference only, and will not be limiting. For example, the words "upwardly", "downwardly", "rightwardly" and "leftwardly" will refer to directions in the drawings to which reference is made. The word "upper" will also be used in reference to the top surface of the work surface structure. The word "front" will be used with reference to the edge of the work surface positioned closest to the user, namely the leftward edge in FIG. 4, and the word "rear" will be used to designate the opposite edge. The words "inward" and "outward" will refer to directions toward and away from, respectively, the geometric center of the structure and designated parts thereof. Said terminology will include the words specifically mentioned, derivatives thereof, and words of similar import.

DETAILED DESCRIPTION

Figure 2:
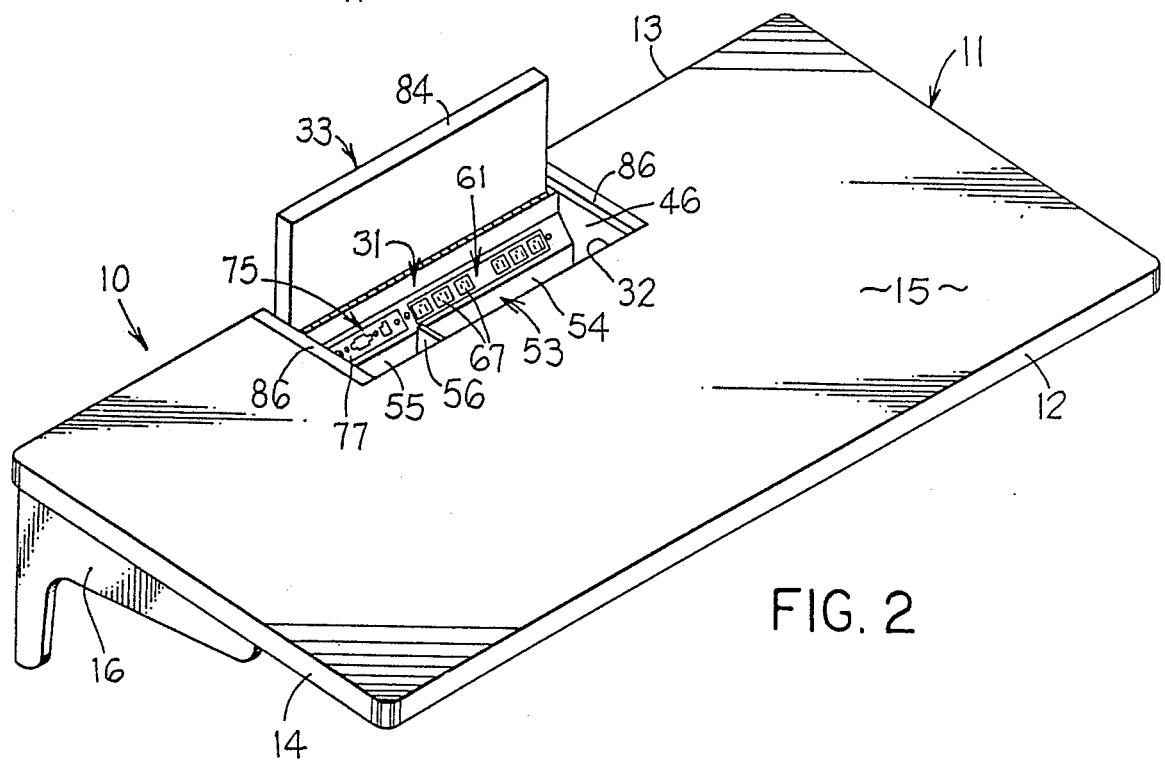
FIG. 2 is a view similar to FIG. 1, but showing the door to the control panel in a raised or open position.

Referring to FIGS. 1-4, there is illustrated a work surface structure 10 according to the present invention. This structure includes a substantially flat sheetlike top member 11 having parallel front and rear edges 12 and 13, respectively, and substantially parallel side or end edges 14, whereby the top member 11 is hence of a substantially rectangular configuration. The top member defines thereon a horizontally enlarged planar upper working surface 15.

The working surface structure 10 is particularly desirable for attachment to a wall panel of an open office system. For such usage, the work surface structure 10 is provided with a pair of substantially identical L-shaped support arms 16 which detachably mount to the undersurface of the structure directly adjacent the opposite end edges thereof. These support arms 16 have rearwardly projecting hooks 17 associated with the vertical leg thereof, which hooks releasably engage within a vertically slotted end post as associated with an upright space-divider wall panel 18. The mounting of structure 10 on the panel 18 by the pair of supports 16 hence results in the structure 10 projecting outwardly from the front surface 19 of the wall panel in substantially perpendicular relationship thereto. The structure of the supports 16 and their attachment to the work surface structure and panel posts is conventional, and on example of such structure is illustrated in U.S. Pat. No. 4,198,913 as owned by the Assignee of this application.

When the work surface structure 10 is mounted on the wall panel 18 as illustrated in FIG. 4, the rear edge 13 is normally spaced slightly away from the front panel surface 19 by means of an intermediate clearance space 21 therebetween. In addition, it is conventional in open office systems to mount a tack board unit 22 on the panel over the region of the front surface 19 thereof which is disposed directly above the work surface structure. This tack board unit 22 normally has a depth which slightly exceeds the clearance space 21 so that the tack board hence slightly overlaps, the upper working surface 15.

The overall assembly described above, as illustrated by FIG. 4, is well known in the office furniture industry.

The work surface structure 10 of this invention mounts thereon a power and communication module 31, which module is disposed below the top member 11 but is accessible through an access opening 32 formed therein, the latter being closed by means of a swingable cover or door 33.

The power and communication module 31 includes an elongated channel or trough 36 which is fixed to the underside of the top 11 and projects downwardly thereof. This trough 36 extends longitudinally throughout substantially the full length of the top 11 and is disposed closely adjacent the rear edge 13 thereof. Channel 36 includes a front wall 37, a bottom wall 38 and a rear wall 39 which is of a generally Z-shaped configuration. This rear wall 39 includes a lower vertical portion 41 and an upper vertical portion 42 which is offset rearwardly from the lower portion, with these portions 41 and 42 being joined by an intermediate portion 43 which slopes upwardly and rearwardly from the lower portion 41 to the upper portion 42 at an angle of approximately 45° with respect to the vertical. Channel 36 is closed at opposite ends thereof by end walls 44 and 45. The upper side of the channel is generally closed by the top member 11, and the channel has a pair of intermediate divider walls 46 and 47 which extend vertically thereacross, these divider walls being disposed close to but slightly outwardly from the side edges of the access opening 32.

The channel 36 defines therein a first cable storage compartment 48 as disposed between the end wall 44 and divider 46, this compartment being accessible through an opening 49 formed in the rear wall 39. A second cable storage compartment 51 is formed between the other end wall 45 and the divider wall 47, with a further opening 52 being formed in the rear wall 39 so as to access the compartment 51. The openings 49 and 52 are spaced upwardly from the channel bottom wall 38, but the openings are of rather large size, so that cables can be inserted through the openings and conveniently stored within the compartments, particularly since the openings are smaller than the compartments so that the rear wall effectively forms a lip around the compartment to assist in retaining the cable therein.

The channel 36 defines therein a further compartment 53 which extends between the dividers 46 and 47. This compartment 53, hereinafter referred to as the console compartment, is aligned directly below and hence is accessible through the access opening 32. This console compartment in turn is divided into two cable storage chambers 54 and 55 by means of an intermediate divider wall 56 which is positioned within the channel and extends between the front and rear walls thereof. This intermediate divider wall 56, however, extends upward from the bottom wall 38 to an elevation which approximately corresponds to the height of the lower rear wall portion 41.

The power and communication module 31 includes a power unit 61 which is detachably secured to the channel 36 and is accessible from the console compartment 53. This power unit 61 (FIGS. 3 and 4) includes a housing 62 which is of a five-sided configuration in cross section and includes a lower vertical front wall 63 and an upper sloped front wall 64, which walls are positionable directly adjacent the rear walls 41, and 43, respectively. The power unit 61 is secured to the channel 36 by appropriate fasteners or screws 65 and 66.

Power unit 61 mounts thereon a plurality, here six, of conventional three-hole electrical receptacles 67, which receptacles 67 are sidewardly spaced apart and project slightly outwardly from the sloped upper front wall 64. The rear wall portion 43 of channel 36, within the console compartment 53, has an elongated slot 68 formed therethrough, which slot is effectively closed by the sloped wall 64 of the power unit 61 so that the receptacles 67 hence project into and through the slot 68 so as to be readily accessible within the console compartment 53. The one cable storage chamber 54 extends throughout the approximate length of the power unit 61 so that this cable storage compartment 54 is positioned in front of the receptacles 67.

Power unit 61 has a conventional power cord 69 joined thereto and projecting outwardly from one of the ends thereof, which power cord terminates in a conventional three-pronged plug. This power cord is adapted to be inserted in any conventional three-hole electrical receptacle so as to permit energization of the power unit 61. When used with open office systems, the wall panels are typically electrified by means of integrated electrical circuitry extending along the lower raceways of the panels, and these raceways have receptacles associated therewith which open sidewardly of the panels, such as illustrated by U.S. Pat. No. 4,377,724. The plug associated with the power cord 69 can hence be inserted into one of the receptacles associated with the raceway of the respective panel to which the work surface structure is secured.

A conventional three-hole receptacle 71 is also normally provided on one of the exposed end walls of the power unit 61 so as to permit other equipment to be electrically plugged thereto if desired. A neon panel lamp 72 is also provided on this end panel and is energized whenever the power unit is energized. A resettable push-type circuit breaker 73 is also provided so as to internally disrupt energization within the power unit 61 in the event of an electrical overload.

If desired, the power unit 61 could be provided with one of the receptacles 67 functioning as a master receptacle so as to hence permit energization of some of the remaining receptacles only when the master receptacle is connected to a plug. The unit could also be provided with whatever filtering equipment is necessary pursuant to the demands of the equipment being connected thereto. The internal structure of the power unit 61 is conventional and well known, and in fact portable such power units joined to and used in a manner similar to an extension cord are well known, and the unit 61 of this invention incorporates therein the same basic structure so that further description thereof is believed unnecessary.

The console compartment 53 also provides access to a communication connector unit 75. For this purpose, the rear wall portion 43 of the channel has a further elongated slot 76 formed therethrough, which slot 76 communicates with the compartment 53 and extends substantially along the length of the other cable storage chamber 55. A connector support plate 77 is secured to the rear side of the wall portion 43, such as by screws 78, so that the support plate 77 hence extends across and substantially closes off the slot 76. This connector support plate 77 is provided with a plurality of connector holes 79 therethrough, there being four such holes designated 79A through 79D in the illustrated embodiment. The connector hole 79A has the configuration required for mounting an IBM data connector therein, the hole 79B is of a circular configuration so as to mount a standard coaxial connector therein, the hole 79C is of an elongated configuration for mounting a standard RS-type connector therein of the type used on computers and the like, and hole 79D has the configuration required for a standard telephone connector of the type which receives a telephone jack. These connectors (not shown) are individually secured to the support plate 77 in a conventional manner so that the connectors hence project through the plate into, and hence are accessible from within the compartment 53. The connectors project upwardly and inwardly at an angle of substantially 45 degrees, similar to the receptacles 67, so as to be readily accessible through the access opening 32 when the cover 33 is in its open position.

The connector support plate 77 may be provided with any selected ones or various combinations of the connector holes 79A through 79D depending upon the user requirements. For this reason, the support plate 77 is detachably secured to the channel 36, as by a pair of screws, and a family of plates 77 may be provided having different combinations of connector holes therein so as to permit any selected one of the plates 77 to be secured to the channel depending upon the user's requirements. The plate 77 is generally provided with at least the hole 79D so as to permit a communication jack to be mounted thereon for connection to a telephone. The plate 77 is also typically provided with at least one of the holes 79A through 79C.

To provide access to the console compartment 53, and hence access oo the power unit 61 or the connector unit 75, the top member 11 has the access opening 32 formed therethrough. This access opening 32 is of substantially rectangular shape when viewed from the top and projects inwardly from the rear edge 13 so as to be substantially uniformly positioned midway between the end edges 14. The cover or door 33 is provided for closing this access opening 32, and the cover 33 has a rear edge 81 which aligns with the top member rear edge 13 when the cover is in the closed horizontal position. This cover 33 defines thereon a flat upper surface 82 which, when the cover is closed, is coplanar with and hence effectively defines an extension of the upper working surface 15.

Cover 33 is secured by a horizontally elongated hinge 83, such as a piano-type hinge, to the channel 36. This hinge 83 is secured between the underside of the cover and the upper edge of the rear channel wall 42 whereby the horizontal hinge axis defined by hinge 83 is hence spaced inwardly a substantial distance from the rear edges 13 and 81. This positioning of hinge 83 hence enables the cover to be vertically swung upwardly into an open vertical position substantially as illustrated by dotted lines in FIG. 4. When in this vertical open position, the cover 33 is positioned in its entirety forwardly from the rear edge 13 so that the cover hence will readily accommodate the positioning of the tack board 22, as illustrated by FIG. 4, whereby the tack board does not interfere with the movement of the cover into its fully open position. The lower rearward edge of the cover, when in the open position, hence swings downwardly below the top member 11 so as to be positioned directly adjacent the rear channel wall 42. This positioning of the hinge 83 also results in the rear edge 81 of the cover swinging downwardly and substantially away from the wall panel during the opening movement so that the cover does not contact or bind against the wall panel. This positioning of the hinge inwardly also effects a partial counterbalancing of the cover during its swinging movement, and in fact the weight of the cover is disposed rearwardly of the hinge when the cover is fully opened so as to automatically hold the cover in its fully opened position.

To securely support the cover 33 in its closed position as indicated by FIG. 6, the front edge 84 of the cover rests against a small horizontal flange 85 which is secured to the front wall of the channel and projects inwardly a small distance beyond the front edge of the access opening 32. This hence stably and securely supports the cover in its closed position so that substantial weight can be positioned on the closed cover, whereupon the cover hence can effectively and fully function as an integral part of the upper working surface 15.

The access opening 32 has a width (as measured in a longitudinal direction of the top) which is greater than the width of the cover, and the end edges of the access opening 32 have strips 86 of a resilient or elastomeric material secured thereto, as by adhesive bonding. These elastomeric strips 66 may be of a generally L-shaped configuration as illustrated in FIG. 5. In fact, the upper leg is preferably of a hollow tubelike configuration as shown in FIG. 5A so as to facilitate the compression thereof. The end edges 87 of the cover may be of a sloped or inwardly tapered configuration as they project downwardly since this greatly facilitates the snug engagement of the side walls 87 with the resilient strips 86 when the cover is swingably moved downwardly into its closed position. However, the end edges 87 may be vertically straight if desired.

The elastomeric strips 86 are preferably of substantial width, such as in the order of ½ to ¾ inch, whereby they will permit sufficient deformation so as to permit electrical, communication or data cables to pass through the strips 86 directly adjacent the cover side, walls 87. This is illustrated by the cables 88 associated with the computer 89 appearing in dotted lines in FIG. 1, whereby the cables 88 can hence pass downwardly into the closed console compartment 53 so as to be connected either to the power unit 61 or the connector unit 75.

OPERATION

While use of the work surface structure 10 is believed self-evident from the description set forth above, nevertheless same will be briefly described to insure a complete understanding thereof.

To provide electrical power to the power unit 61, the plug on the cord 69 is inserted into a conventional receptacle, such as the sidewardly-facing receptacle associated with one side of the wall panel. If necessary, any excess length of cord can be coiled and positioned within the storage compartment 51 to prevent an unsightly accumulation of cable on the floor.

Similarly, any communication cables can likewise be fed from external locations to the rear of the support plate 77, whereupon the cables can either be connected to the connectors already mounted on the support plate or, if the cables have their own connectors thereon, then the connectors can be inserted through the appropriate opening and secured to the support plate 77. Any excess length of cable can be coiled and inserted into the appropriate compartment 48 or 51.

The work surface structure 10 is now in a position to permit user equipment, such as telephones, type-writers, computers and the like, to be supported thereon and connected to the power and communication module 31. For this purpose, the door 33 is manually swung upwardly into its open position, whereupon the door automatically remains in this open position due to its off-center support. Equipment having conventional plugs can then be electrified by inserting the plugs into the receptacles 67. Similarly, communication cables can similarly be joined to the connectors associated with the connector unit 75. Assuming the equipment to be positioned in the approximate desired location, then the user can insert any excess power cable into the storage chamber 54, and any excess data/communication cable can be inserted into the other storage chamber 55. The cables leaving the compartment 53 are positioned so that they pass over one of the deformable rubberlike edge strips 86 whereupon the door 33 is then manually swung to its closed position. If desired or necessary, the cables can be slid rearwardly along the edge strips 86 toward the rear edge 13 of the top so as to position the cables in a location which is least apt to create inconvenience to the user. After closing of the door 33, some of the equipment can even be positioned over the door if desired. Hence, the work surface structure can now be utilized and the user is not faced with the problem of excessive lengths of power/data/communication cables extending along the work surface or on the floor surrounding the work surface.

The attachment of power/data/communication cables to the power and communication module is particularly simple and convenient since, once the door 33 is open, all of the power/data/communication connectors are readily oriented at an angle of about 45 degrees so that this hence provides an extremely convenient angle for permitting the user to insert a plug or connector into the compartment 53 for joining to the mating connector provided therein. At the same time, the connectors themselves are hence disposed entirely below the door when the latter is closed so as to provide protection therefor so that the connector are not accidentally contacted or dislodged, and the connectors are also maintained in a clean and hence safe environment. Further, the positioning of the power and control module centrally of the upper working surface adjacent the rear edge thereof also provides optimum convenience with respect to the locating of most equipment on the working surface, and also minimizes the amount of cable which must necessarily be positioned on the working surface.

While the working surface structure has been illustrated and described in relationship to its mounting on a wall panel, nevertheless it will be appreciated that the work surface structure of this invention could also be provided as the top of a free-standing desk or table while retaining many of the same advantageous structural and functional features.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In combination, an upright space-divider wall panel, and a work surface structure detachably mounted on said wall panel so as to project generally horizontally outwardly from one side of said wall panel in generally cantilevered relationship relative thereto, said work surface structure having a horizontally extending platelike top member with a substantially planar upper working surface, the top member being of substantially rectangular configuration and including front and rear edges and a pair of end edges extending therebetween, said work surface structure comprising:

a power module means secured to said top member adjacent to and extending longitudinally along said rear edge for providing electrical power for electrical equipment adapted to be supported on said top member;

an upwardly-oriented access opening associated with said power module means, said access opening being adjacent said rear edge and horizontally elongated generally parallel therewith;

cover means pivotally supported relative to said top member for movement between (1) a closed position wherein it closes off said access opening and is substantially flush with said upper working surface and (2) an open position wherein said access opening is exposed;

said module means including a housing which is secured to and projects downwardly relative to said top member and defines therein a main compartment which is disposed below and accessible through said access opening, said housing being horizontally elongated generally parallel with said rear edge;

said module means including an electrical power unit removably secured to said housing and having a wall which mounts thereon a plurality of electrical receptacles, said wall and the electrical receptacles thereon being accessible solely from said main compartment, said wall being spaced downwardly from said cover means and being sloped upwardly as it projects rearwardly so as to face both upwardly and forwardly for increased accessibility and visibility of the receptacles mounted thereon when the cover means is in its open position; and said main compartment as defined within said housing defining an open space in front of said wall and extending downwardly below said receptacles for storing cables therein.

2. A combination according to claim 1, wherein the housing has a rear wall portion which is generally parallel with the wall of the power unit and has opening means extending therethrough, a communication support plate secured thereto so as to overlap the lastmentioned opening means, said communication support plate having at least one connector opening extending therethrough, at least one communication connector mounted on said support plate and projecting through the connector opening so as to project into said main compartment, and said power unit being attached to said housing rearwardly of said rear wall portion.

3. A combination according to claim 1, wherein said housing includes front and rear walls which are horizontally spaced apart and project generally downwardly in substantially aprallel relationship from said top member for defining said main compartment therebetween, said housing including a further wall which is spaced downwardly from said rear wall and which is sloped upwardly as it projects rearwardly for joining with said rear wall so that said further wall faces generally upwardly and forwardly for increased accessibility and visibility through the access opening when the cover means is in its open position, said further wall having said power unit associated therewith but disposed rearwardly thereof so that the plurality of receptacles extend along a plane which is generally parallel with said further wall, said further wall also having communication connector means mounted thereon so as to be accessible solely from said main compartment.

4. A combination according to claim 1, wherein the housing defines an elongated channel which extends longitudinally adjacent the rear edge of said top member throughout substantially the full longitudinal extent thereof, said channel including a secondary storage compartment for cable therein which is disposed longitudinally adjacent said main compartment.

5. In combination, an upright space-divider wall panel, and a work surface structure detachably mounted on said wall panel so as to project generally horizontally outwardly from one side of said wall panel in generally cantilevered relationship relative thereto, said work surface structure having a horizontally extending platelike top member with a substantially planar upper working surface, the top member being of substantially rectangular configuration and including front and rear edges and a pair of end edges extending therebetween, said work surface structure comprising:

horizontally elongated channel means stationarily secured relative to said top member adjacent said rear edge and extending therealong throughout substantially the full length of said top member, said channel means defining therein a main storage compartment which opens downwardly relative to said upper working surface and is defined between front and rear walls for permitting storage of cables or wires within said main compartment, said main compartment being horizontally elongated in a direction generally along said rear edge and defining an upwardly-oriented access opening for providing access thereto;

cover means pivotally supported relative to said top member for movement between (1) a closed position wherein it closes off said access opening and is substantially flush with said upper working surface and (2) an open position wherein said access opening is exposed;

power module means secured to said channel means for providing electrical power for electrical equipment adapted to be supported on said top member, said power module means including an electrical power unit removably secured to said channel means and having a wall which mounts thereon a plurality of electrical receptacles, said last-mentioned wall and the electrical receptacles thereon being accessible solely from said main compartment, said last-mentioned wall being spaced downwardly from said cover means and being sloped upwardly as it projects rearwardly so as to face both upwardly and forwardly for increased accessability and visibility of the receptacles mounted thereon when the cover means is in its open position;

said main compartment defining therein an open space in front of said last-mentioned wall and extending downwardly below said receptacles for storing wires or cables therein; and said channel means defining therein a secondary compartment which is also disposed adjacent said rear edge and spaced longitudinally therealong from said main compartment, said secondary compartment permitting wires or cables to be disposed therein.

6. A combination according to claim 5, wherein said power unit is positioned rearwardly of said rear wall.

* * * * *